(12) United States Patent
Levy et al.

(10) Patent No.: US 6,745,174 B2
(45) Date of Patent: Jun. 1, 2004

(54) METHOD OF EXECUTING BEFORE-TRIGGERS IN AN ACTIVE DATABASE

(75) Inventors: Eliezer Levy, Haifa (IL); Yuval Sherman, Haifa (IL); Nitzan Peleg, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 404 days.

(21) Appl. No.: 09/822,996

(22) Filed: Mar. 29, 2001

(65) Prior Publication Data

US 2002/0143731 A1 Oct. 3, 2002

(51) Int. Cl.[7] .............................................. G06F 17/30
(52) U.S. Cl. .......................................... 707/2; 707/103
(58) Field of Search ................................ 707/1, 2, 3, 4, 707/5, 6, 7, 8, 9, 10, 100, 101, 103 R, 200; 709/217; 717/141

(56) References Cited

U.S. PATENT DOCUMENTS

| | | | |
|---|---|---|---|
| 5,864,842 A | 1/1999 | Pederson et al. ............... 707/2 |
| 5,873,075 A | 2/1999 | Cochrane et al. ............... 707/2 |
| 5,875,334 A | 2/1999 | Chow et al. .................. 717/141 |
| 5,881,232 A | 3/1999 | Cheng et al. ................ 709/217 |
| 5,884,299 A | 3/1999 | Ramesh et al. ................. 707/2 |
| 5,890,148 A | 3/1999 | Bhargava et al. ............... 707/2 |
| 5,930,795 A | 7/1999 | Chen et al. .................. 707/100 |
| 5,950,188 A | 9/1999 | Wildermuth .................... 707/3 |

*Primary Examiner*—Diane D. Mizrahi
*Assistant Examiner*—Yicun Wu

(57) ABSTRACT

A method for executing before-triggers in an active database. A tree of actions is constructed for each activated before-trigger and a tree of operators is constructed for the statement that activates the trigger. A table affecting operator that is included in the activating statement is removed from the statement tree and a temporary execution operator is formed from any remaining actions of the activating statement. The temporary execution operator and the activated before-triggers are then included in an insertion operator that is configured to send updated rows into a temporary table. The table affecting operator is then interconnected to execute subsequent to the insertion operator. Any activated row-after and statement-after triggers are interconnected to execute subsequent to the execution of the table-affecting operator.

8 Claims, 17 Drawing Sheets

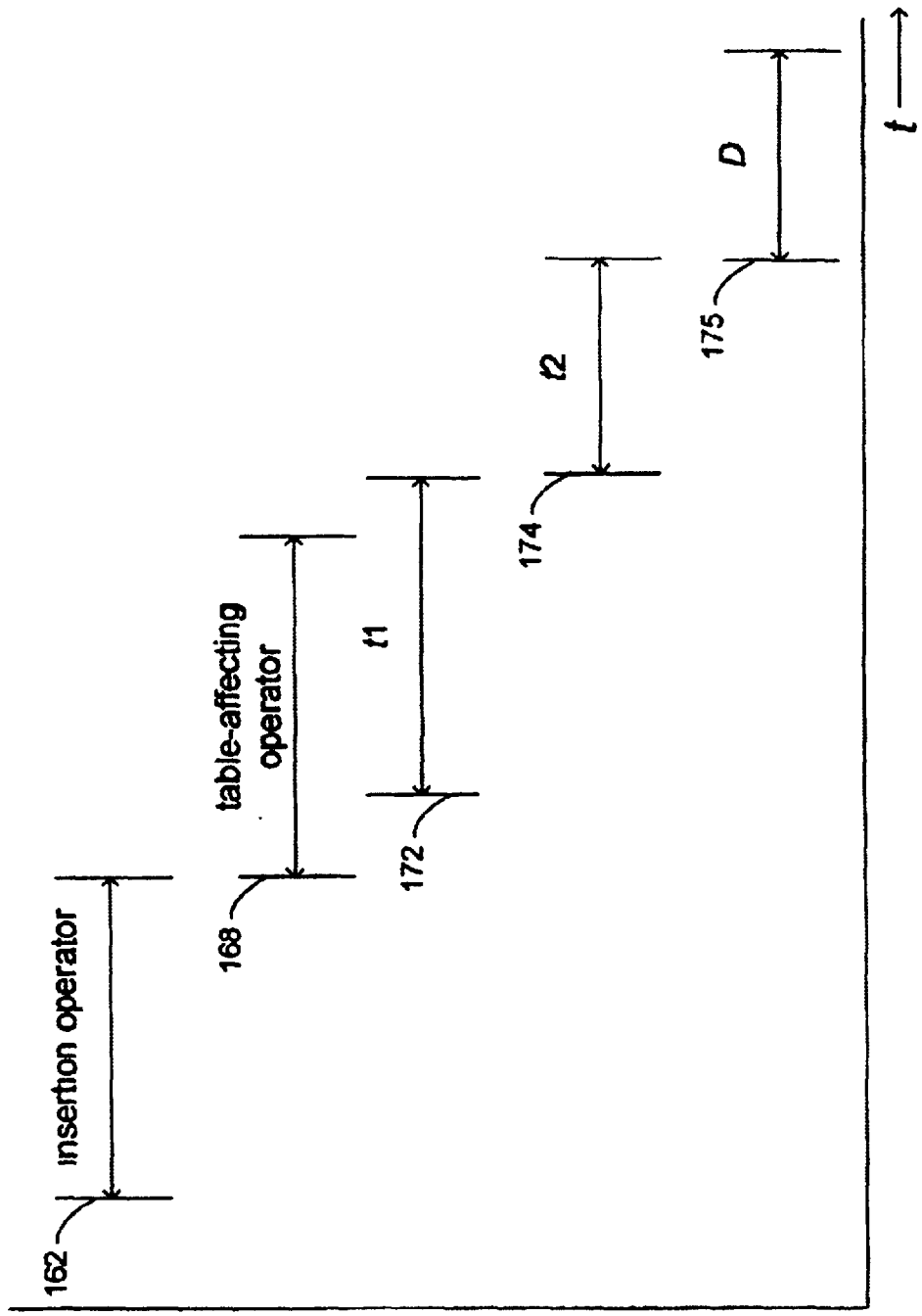

METHOD OF EXECUTING BEFORE-TRIGGERS IN AN ACTIVE DATABASE

CROSS-REFERENCE TO RELATED APPLICATIONS

This application is related to U.S. application entitled "A METHOD OF PARALLEL TRIGGER EXECUTION IN AN ACTIVE DATABASE", Ser. No.09/823,337, now pending filed on Mar. 29, 2001 and U.S. application entitled "A METHOD OF EXECUTING CONFLICTING TRIGGERS IN AN ACTIVE DATABASE", Ser. No. 09/823,340, now pending filed on Mar. 29, 2001.

FIELD OF THE INVENTION

The present invention relates generally to executing triggers in active relational databases and more specifically to the execution of before-triggers in a relational data base management system.

DESCRIPTION OF THE RELATED ART

Database management systems (DBMS) 11, such as the system shown in FIG. 1, have become the dominant means of keeping track of data, especially for servers connected to the Internet. These systems take an organized approach to the storage of data by imposing a data model, typically a relational data model, on the data 17 that is stored in the database 15. Included in the typical DBMS are a Query Processing Engine 13, a File Access and Storage Management subsystem 21 for accessing the database 15, a Concurrency Control subsystem 19 for managing locks needed for concurrency on database items (tables and rows) and a Recovery Control Subsystem 23 for restoring the DBMS 23 to a consistent state after a fatal error. The latter two subsystems 19, 23, are interconnected with the File Access and Storage Management subsystem 21.

In the relational data model, data is stored as a relation, which has two aspects, the relation schema and the relation instance. The relation schema specifies the relation's name, and the name and domain of each column in the relation. The relation instance is a set of records (also called rows or tuples) that conform to the relation schema. A relation instance is therefore a table of records, each of which has a column that meets the domain constraints imposed by the schema.

Not only does the DBMS impose a constraint on storage of data, a DBMS usually formalizes the means by which information may be requested from the database. In particular, a query language is specified by which questions may be put to the database. The language is usually based on a formal logic structure such as relational algebra or calculus. Queries are usually carried out in the DBMS 11 by a Query Processing Engine 13, which has a number of components for parsing a query, creating a query plan, and evaluating the query plan. In particular, a component of the Query Processing Engine 13, a Query Optimizer, creates one or more query plans, each in the form of a tree of relational operators, that are evaluated for execution of the query based on some efficiency metric.

Relational operators take one or more tables as inputs and generate a new table as the output. For example, a selection operator selects one or more rows of an input table meeting the selection criteria to produce an output table having only those rows. Operators can be composed since an operator may take as input a table generated as the output of another operator. A tree of operators is the representation of a composition of the relational operators appearing as the nodes of the tree.

A tree of such operators for a particular query plan is shown in FIG. 3. As can be observed from the tree of FIG. 3, relational operators are connected to each other and to base tables T1 and T2 by means of queues Q1–Q4. These queues supply input rows to a particular operator and store output rows from the operator. The queues allow an operator to start processing rows as soon as the operator that supplies the rows begins to produce them and before all rows are produced. Such pipelining improves the efficiency of the system because intermediate results need not be stored in a temporary table and then read again for input.

The standard language for implementing a DBMS is the Structured Query Language (SQL). This language includes Triggers, which are actions executed by the DMBS under certain conditions.

A database having a set of triggers is called an active database and each trigger in the database has three parts, an event, a condition and an action. The event part is a change to the database, such as an insertion, deletion, or modification of a table, that activates the trigger. The SQL statement which is the activating event, is termed the activating statement. A condition is a test by the activated trigger to determine whether the trigger action should occur and an action is an SQL statement that is executed if the trigger event and trigger condition are both satisfied. The set of rows affected (i.e., inserted, updated, or deleted) by the activating statement is termed the affected set of rows for the relevant trigger.

The action part of the trigger can occur either before or after the activating statement. If before, it is called a before-trigger and if after, it is called an after-trigger. In addition, triggers can operate at the row level or the statement level. A statement trigger executes its action once per activating statement and a row trigger executes its action for each row in the affected set. The combination of "before" and "after" with "row" and "statement" creates four different types of triggers. Chain reactions of trigger actions and recursive trigger actions are also possible.

The execution of triggers in a relational database is governed by the proposed ANSI standard for SQL (SQL:1999) which places certain restrictions on trigger execution. A chief restriction is that the triggers be executed serially in their creation time order or at least that the serial execution of triggers be equivalent in outcome and effect on the database to the execution of triggers in their creation time order. However, the serial execution of triggers including before-triggers, in accordance with the proposed ANSI:99 standard, would seriously affect the performance of the DMBS, especially if many before-trigger actions are involved. Thus, there is a need for the improved execution of multiple before-trigger actions for improved performance of such actions over a purely sequential execution, but still conforming to the ANSI standard.

BRIEF SUMMARY OF THE INVENTION

The present invention is directed towards the above need. A method, in accordance with the present invention, of forming an execution plan for a plurality of trigger actions in an active database includes determining the triggers activated by an activating statement, where the activated triggers are before-triggers. The method further includes forming an operator tree for the activating statement, where the activating statement includes a table-affecting operator and forming an action tree for each trigger action that is activated by the statement. Next, the table-affecting operator is removed from the activating statement operator tree and a tentative execution operator is created that includes any operations of the activating statement other than the table-affecting operator. A temporary table for accumulating rows affected by the tentative execution operator and the activated before triggers is then obtained. Following this a subtree is formed by interconnecting an insertion operator between the temporary table and a flow operator that is operative to receive the operator tree input rows and pipeline the rows to the insertion operator. The actions of the activated before-triggers and the tentative execution operation are then inserted into the flow between the operator tree input and temporary table and the table-affecting operator, which receives input from the temporary table, is then connected to the subtree for execution after the execution of the subtree.

Any row after-triggers that are activated by the activating statement are interconnected for pipelined execution with the table-affecting operator and any statement after-triggers are interconnected for execution subsequent to the activating statement.

An advantage of the present invention is that before triggers are executed as a combined trigger to reduce the execution time of the triggers compared to purely sequential execution of the before triggers.

BRIEF DESCRIPTION OF THE DRAWINGS

These and other features, aspects and advantages of the present invention will become better understood with regard to the following description, appended claims, and accompanying drawings where:

FIG. 16 shows a timing chart for the execution of the plan according to FIG. 15.

DETAILED DESCRIPTION OF THE INVENTION

Figure 1:
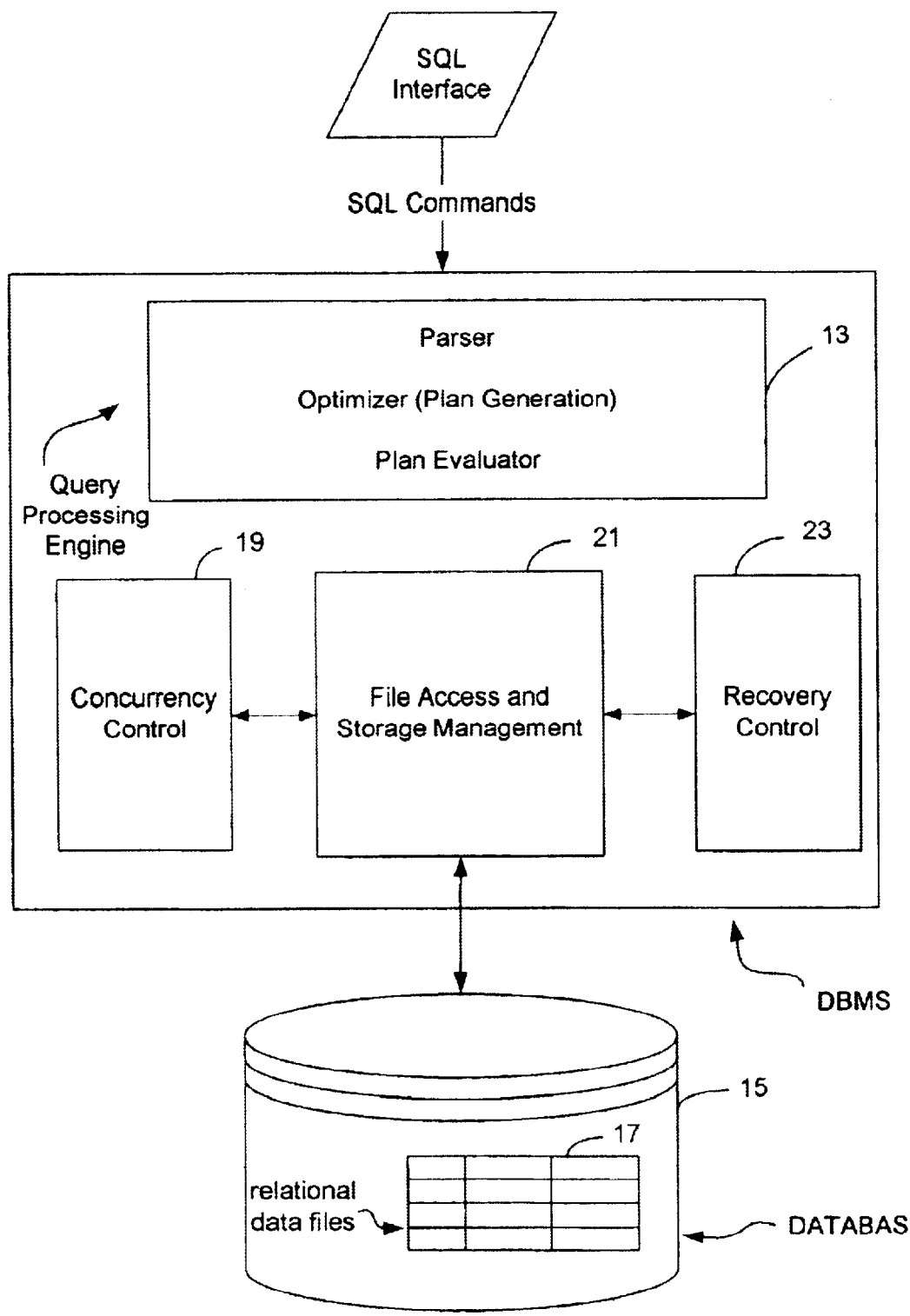
FIG. 1 illustrates a typical database management system.
Figure 2A:
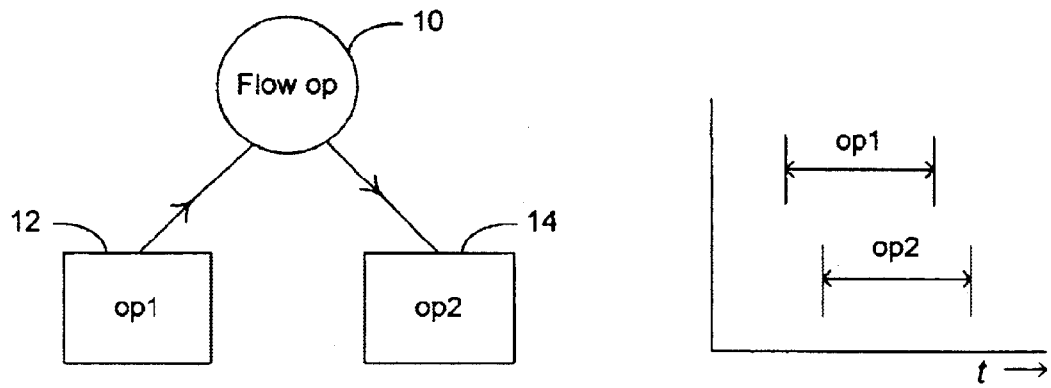
FIG. 2A illustrates a Flow operator.

The present invention relies on a number of operators to control the execution of operations in both an activating statement and its associated trigger trees. The first of these operators is illustrated in FIG. 2A which shows a Flow Operator. The function of this operator is to move the output of operator op1 12 to the input of operator op2 14, as the output of operator op1 is produced. For example, if op1 is a selection operator on a table which selects rows of the table meeting a certain condition, then as the rows meeting the condition are found, say by scanning the table, the rows are sent to the input of op2. This permits the op2 operator to function in parallel to the op1 operator, though, of course, not on the same row that op1 is operating on. FIG. 2A illustrates this "pipelining" operation in a timing chart which shows the activity of op1 overlapped with the activity of op2.

Figures 2B, 2C:
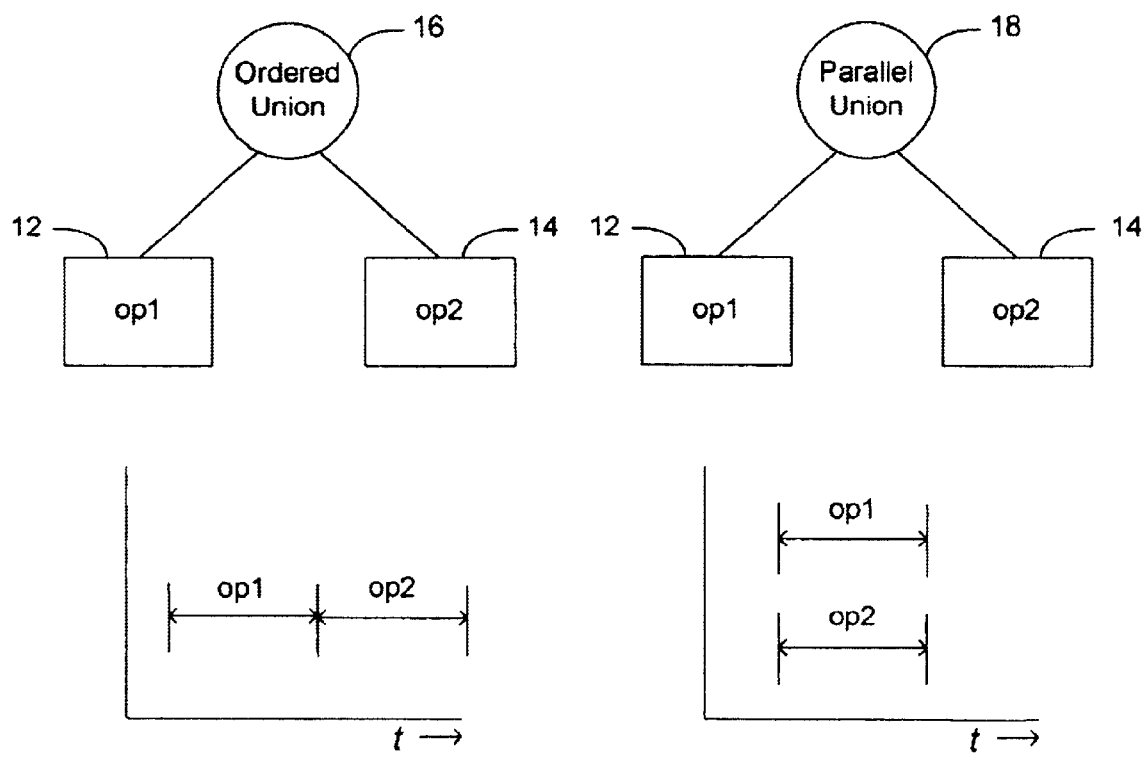
FIG. 2B illustrates an Ordered Union Operator.
FIG. 2C illustrates a Parallel Union Operator.

FIGS. 2B and 2C illustrate the Union Operators. The Ordered Union operator 16 of FIG. 2B forces op2 to operate only after op1 has completed its operations, in effect serializing the op1, op2 operations as shown in the timing chart. The Parallel Union operator 18 allows op2 to operate concurrently with op1, and assumes that op2 has no data access conflict with op1. As is evident from FIGS. 2A and 2C, the flow operator 10 and the parallel union operator 18 reduce the time to carry out the functions of the op1 and op2 operators compared to the ordered union operator 16.

Figure 3:
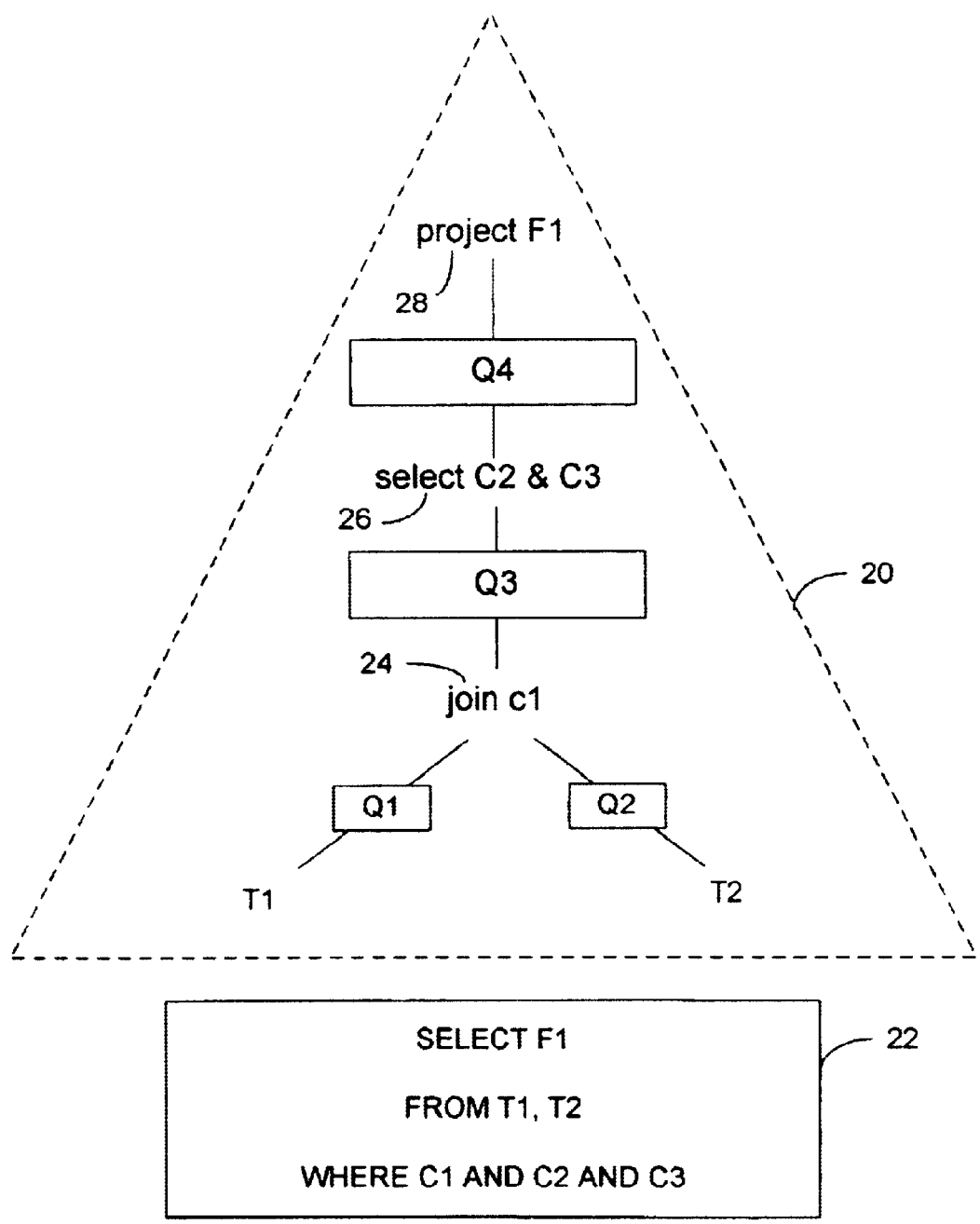
FIG. 3 shows an operator tree for a statement.

Referring to FIG. 3, an operator tree 20 is shown for the given SQL statement 22. The SQL statement 22 projects a desired column F1 from the table created by joining tables T1, T2 and selecting the rows that meet the conjunction of conditions C1, C2 and C3. The operator tree 20 shows one way of implementing the SQL statement 22. According to the tree, first T1 and T2 are joined based on condition C1 by the join operator 24. Next, a selection operator 26 selects the rows of the joined table that meet the condition which is the conjunction of C2 and C3. Finally, a projection operator 28 selects the column F1 from any rows that result from the prior operations. As described above, the function of a Query Optimizer is to form alternative execution plans for a query so that the plans can be evaluated in terms of some performance metric. The tree in FIG. 3 is only one such tree that a Query Optimizer can produce for the given SQL statement.

Figure 4:
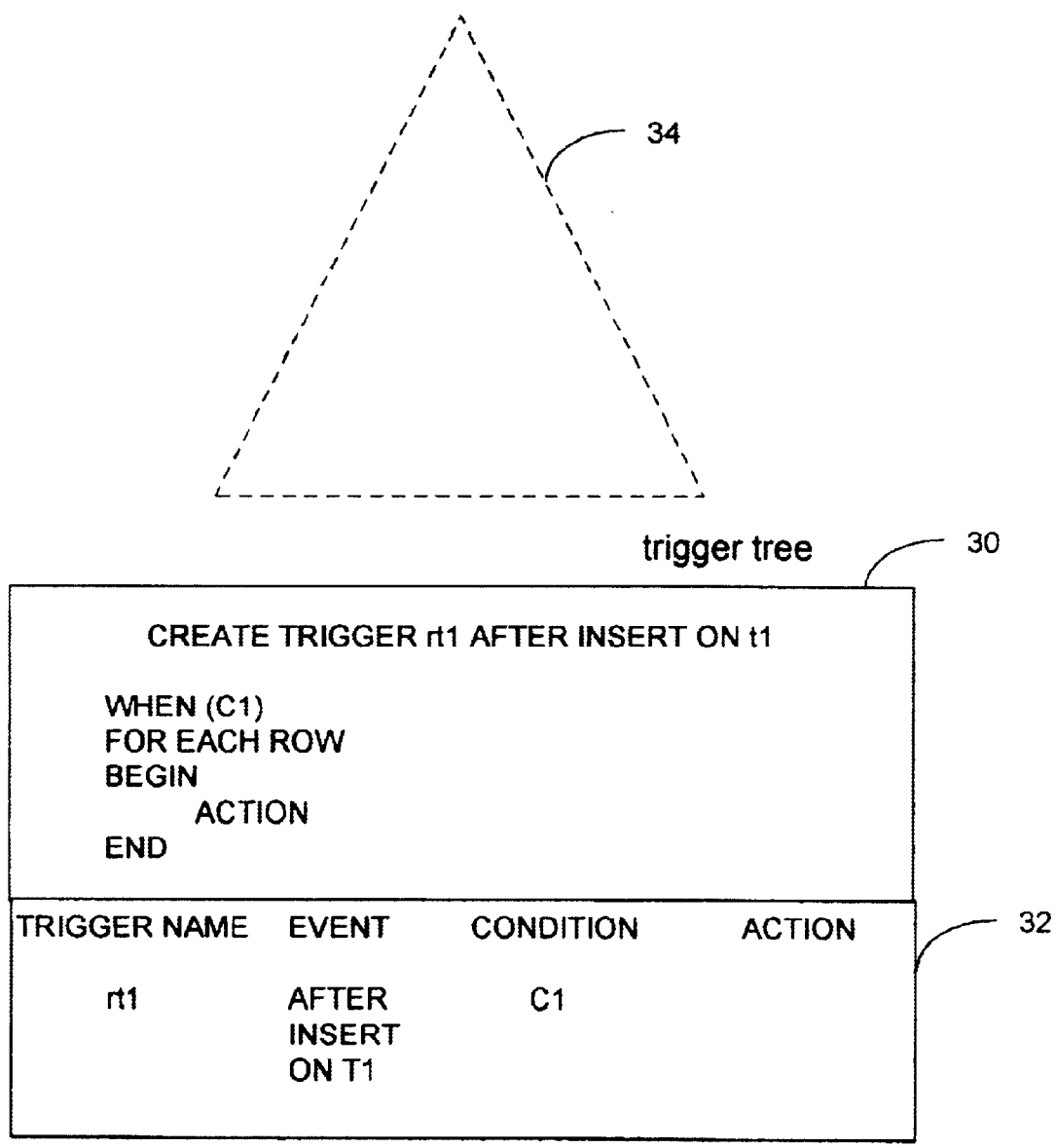
FIG. 4 shows a trigger tree and a representative statement for a trigger.

FIG. 4 shows an SQL statement 30 for a row after-trigger, rt1. The event, condition and action for the trigger are shown in block 32. The event for rt1 is a row insertion into a table T1; the condition is C1, which can be an arbitrary relational condition and the ACTION part of the trigger can be practically any sequence of SQL statements. The trigger tree 34 represents both the condition and the action parts of the trigger.

Figure 5:
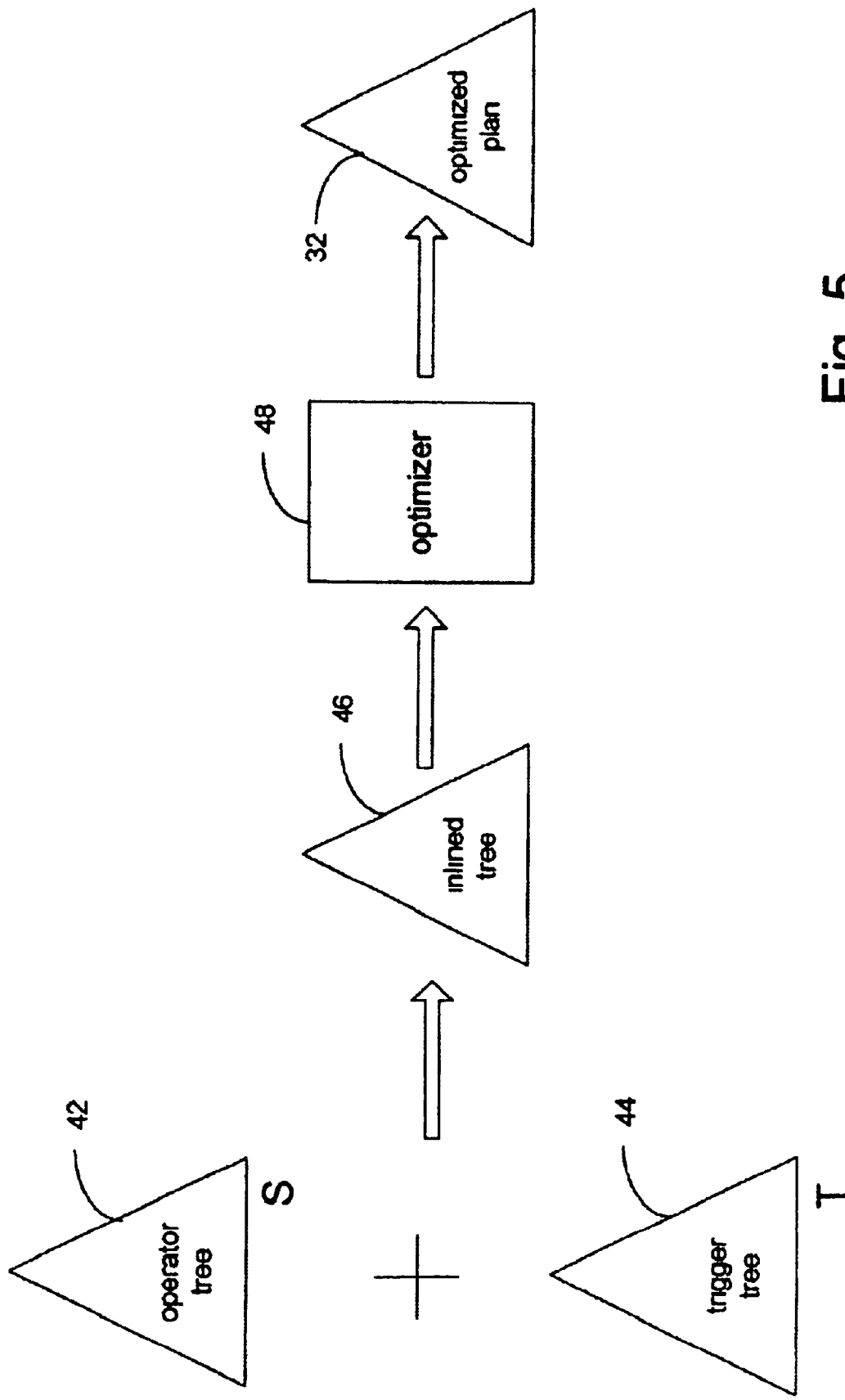
FIG. 5 shows an overview of an aspect of the present invention.

FIG. 5 shows an overview of the present invention. In FIG. 5, an operator tree 42 for an activating statement S is combined, i.e., "inlined," with a trigger tree 44 of a trigger T activated by the statement to create an inlined tree 46. The inlined tree 46 is then processed by an optimizer to create an optimized execution plan 50 for the operators and trigger trees caused by the activating statement S.

Figure 6A:
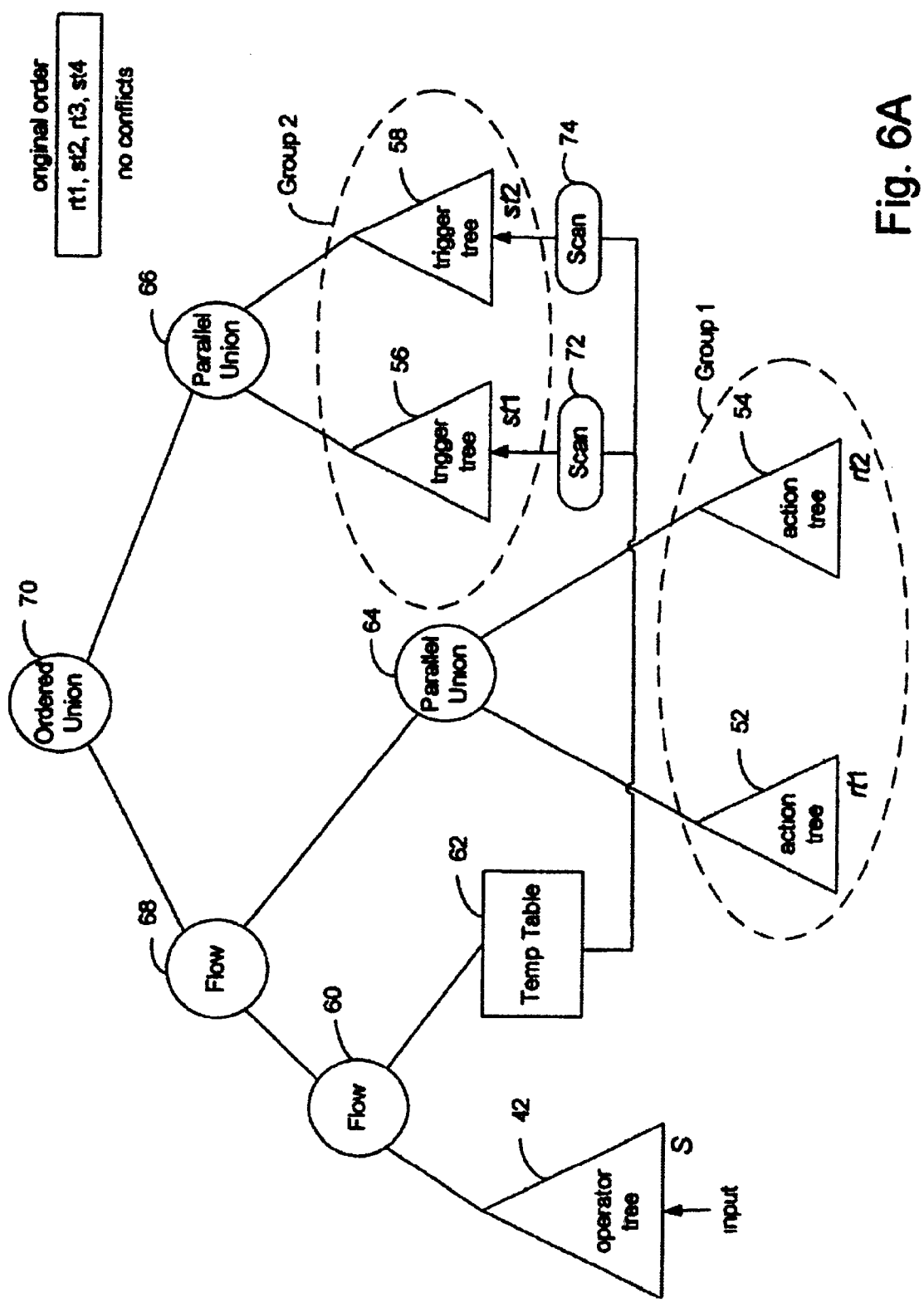
FIG. 6A illustrates a more detailed execution plan when there are no conflicts among triggers.
Figure 6B:
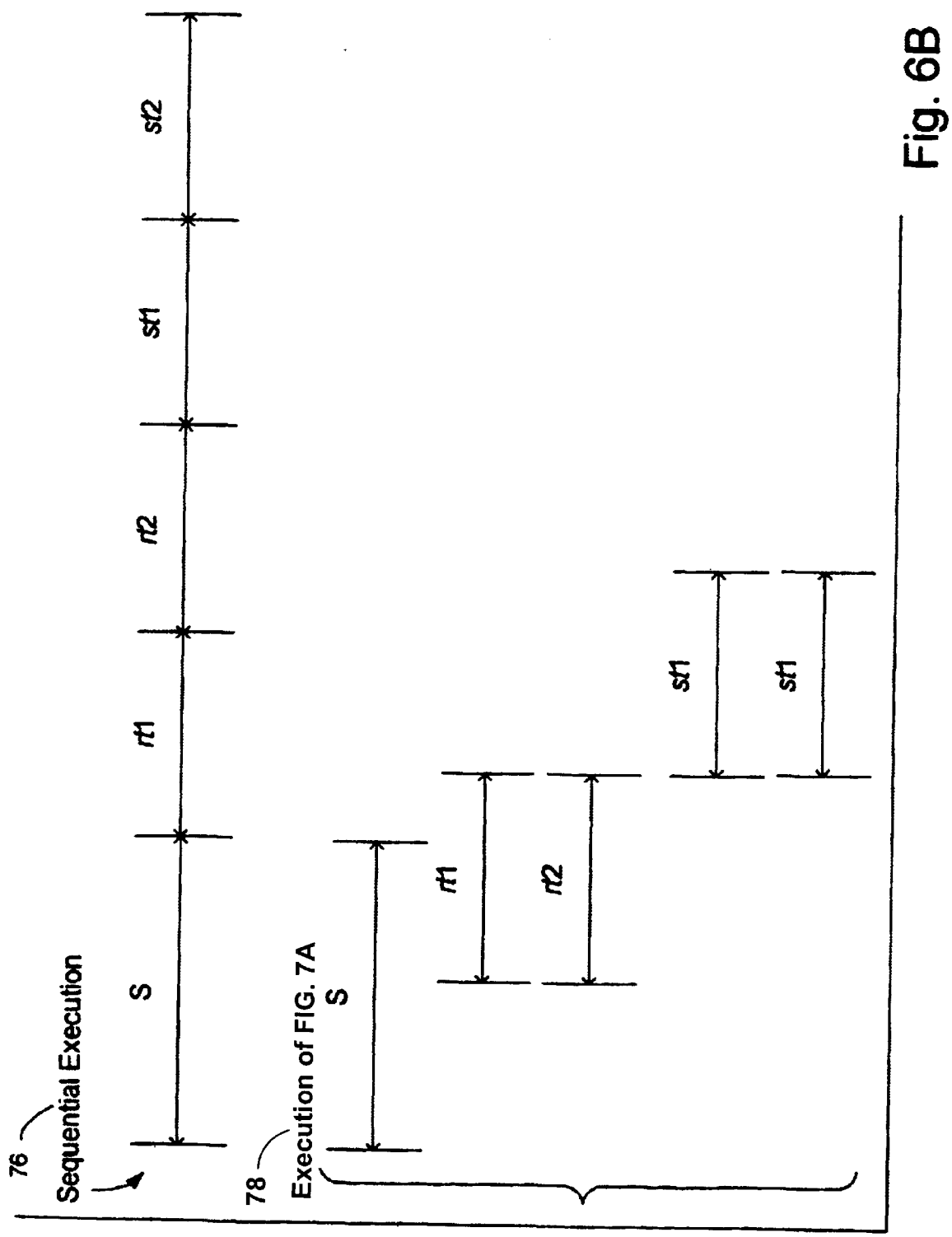
FIG. 6B illustrates a timing chart for the plan of FIG. 6A.

FIG. 6A illustrates a more detailed execution plan formulated in accordance with the present invention illustrated in FIG. 5. In FIGS. 6A and 6B it is assumed that there are no data access conflicts among the activated triggers and between the activated triggers and the activating statement and that all of the activated triggers are after-triggers.

Referring to FIG. 6A, statement S is represented by an operator tree 42, row triggers rt1 and rt2 are represented by trees 52, 54, respectively, and statement triggers st1 and st2 are represented by trees 56 and 58, respectively. It is assumed that statement S is the event that causes activation of the row and statement triggers. In accordance with the present invention, the operator tree 42 produces, as output, the set of affected rows. A flow operator 60 connects the operator tree 42 for statement S to a temporary table, TempTable 62, so that rows that are output by the operator tree 42 are pipelined to the temporary table, TempTable 62. Parallel union operators 64 and 66 connect the trees 52, 54 for rt1 and rt2 and the trees 56, 58 for st1 and st2 so that trees 52 and 54 execute in parallel and trees 56 and 58 execute in parallel.

Another flow operator 68 connects the parallel union operator 64 for rt1 and rt2 to the flow operator 60 connected to the operator tree 42 for statement S so that action trees 52 and 54 execute pipelined to the execution of the statement tree 42. Finally, an ordered union operator 70 connects the flow operator 68 to the parallel union operator 66 for st1 and st2 so that the trees 56 and 58 execute subsequent to the execution of the statement tree 42. The statement trees 56 and 58 receive their inputs by scanning the temporary table, TempTable 62, as represented by the scan functions 72 and 74.

The effect of structure of FIG. 6A is that the row triggers execute in parallel with each other and pipelined with the activating statement and statement triggers execute in parallel with each other but subsequent to the activating statement. Specifically, the structure operates as follows. The operator tree 42 of S operates to generate a stream of affected rows. As the operator tree for S produces the stream of rows, each row is pipelined by the flow operator 60 to the TempTable 62 to prepare for the operation of the statement trigger st1 and st2, which must execute only after statement S is completed. TempTable 62 accumulates the set of affected rows that were produced by the operator tree 42 for S. These changes may need to be made available to the statement trigger trees st1 and st2. Additionally, each row produced by statement S operator tree 42 is pipelined to the row trigger trees rt1 and rt2, which execute in parallel on the pipelined rows. Upon completion of the execution of statement S, and the row triggers rt1 and rt2, the statement triggers st1 and st2 are allowed to execute because of the ordered union operator 70. The statement trigger trees execute in parallel with each other by scanning the TempTable 62 for input data as needed. After the temporary table is used, the contents of the temporary table are deleted by a special delete operator The timing of the execution plan 76 of Statement S, rt1, rt2, st1 and st2, according to the structure of FIG. 6A, is illustrated in FIG. 6B, where S represents the time to execute the statement tree 42, rt1, the time to execute the rt1 action tree 52, rt2 the time to execute the rt2 action tree 54, st1 the time to execute the st1 action tree 56, and st2 the time to execute the st2 action tree 58. As can be noted from the figure, rt1 and rt2 execute in parallel and overlap with the execution of statement S because of pipelining. Statement triggers st1 and st2 execute in parallel but only after the execution of the row triggers. This gives a large decrease in the time to execute the statement S and its associated triggers compared to the case of sequential execution 74 shown in the figure.

Figure 7:
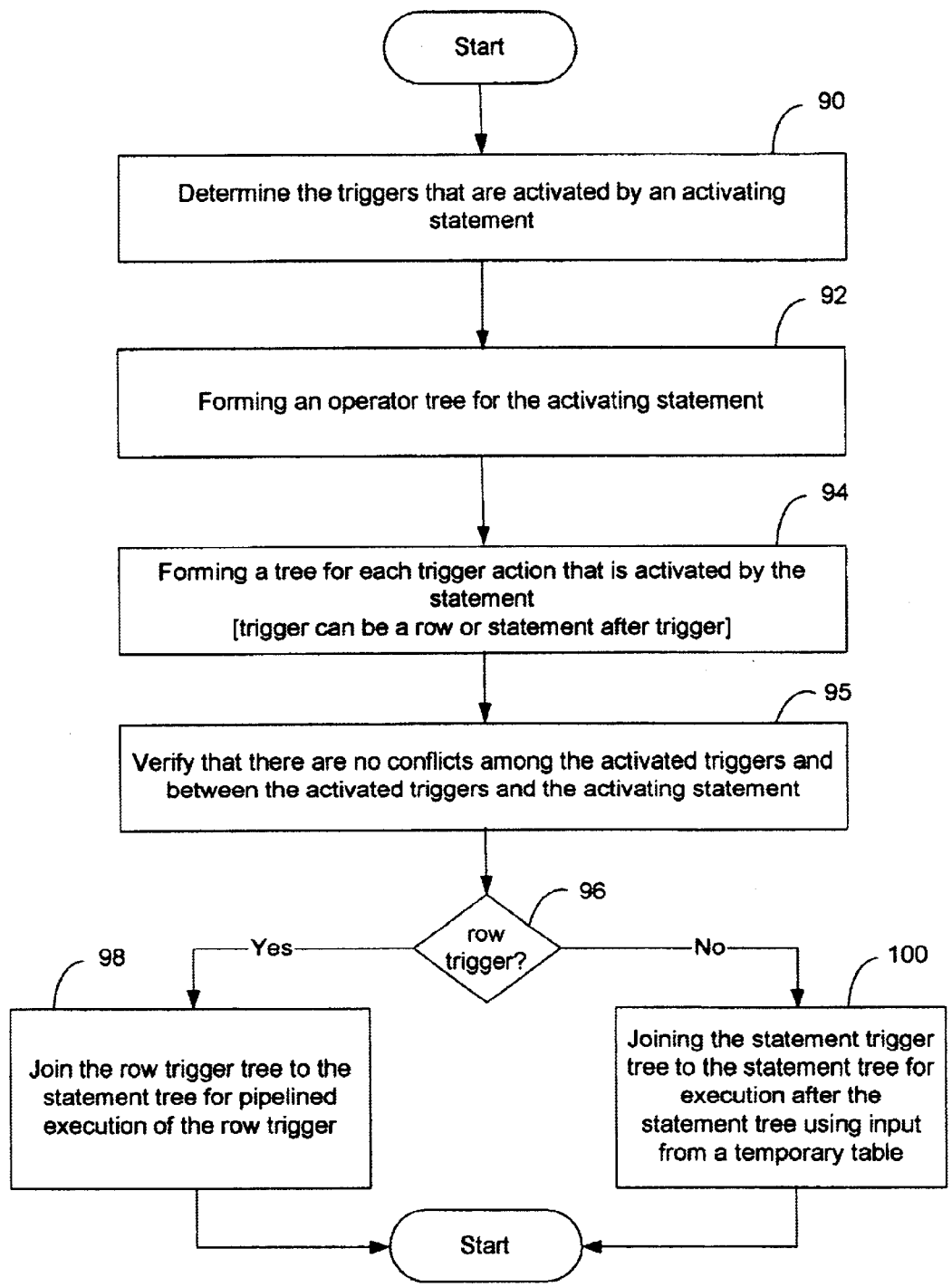
FIG. 7 shows a flow chart for creating an execution plan when there are no conflicts among triggers.

FIG. 7 shows a flow chart of the process for creating an execution plan such as is shown in FIG. 6A. In the process depicted, first the triggers that may be activated by the activating statement are determined in step 90 and an operator tree of the activating statement is formed in step 92. Next, a trigger tree for each of the activated triggers is formed in step 94 and, in step 95, the process then verifies that there are no conflicts among activated triggers and between the activated triggers and the activating statement. An activated trigger is either a row or statement trigger as determined by step 96. If a row trigger is activated, it is joined to the action tree for pipelined execution with the execution of the statement tree in step 98. If a statement trigger is activated, it is joined, in step 100, to the statement tree for execution after the execution of the statement tree using a temporary table as input for the action of the statement trigger. The temporary table accumulates the set of affected rows. The statement trigger scans the temporary table for its input.

The above covers the case of a single row trigger or statement trigger. If more than one row or statement trigger is activated by the activating statement, the row or statement triggers must be combined into the execution plan. In particular, if a number of row triggers is activated, the activated row triggers are combined together into a parallel row group (Group 1 in FIG. 6A) and this parallel row group is the object that is attached to the statement tree for pipelined execution. Internal to the parallel group, each trigger is interconnected by means of a parallel union operator to permit parallel execution of each row trigger within the group. Thus, the execution plan according to the present invention prescribes that each trigger in the parallel group executes in parallel with the other triggers in the group and the entire group execute in a pipeline with the activating statement tree.

If a number of statement triggers is activated, the activated statement triggers are combined together into a parallel statement group (Group 2 in FIG. 6A) and this parallel statement group is the object that is attached to the statement tree for execution subsequent to the statement tree. Again, internal to the parallel group, each trigger is interconnected by means of a parallel union operator to permit parallel execution of each statement trigger within the group. Additionally, each statement trigger during its execution typically scans the TempTable 62 for its input. The execution plan thus prescribes that the statement triggers execute in parallel and the entire group executes subsequent to the execution of the activating statement tree.

Of course, it is possible that both a plurality of row triggers and a plurality of statement triggers are activated by the activating statement. This means that the final execution plan combines the actions trees of both the activated statement triggers and row triggers according to FIG. 6A.

The above description regarding trigger actions deals with after-trigger type actions. As described above if the action part of a trigger must affect a row prior to the execution of the activating statement, then it is termed a before-trigger. The current definition of SQL:1999 permits before-triggers and these triggers must be handled along with any after-triggers that are present.

Figure 8:
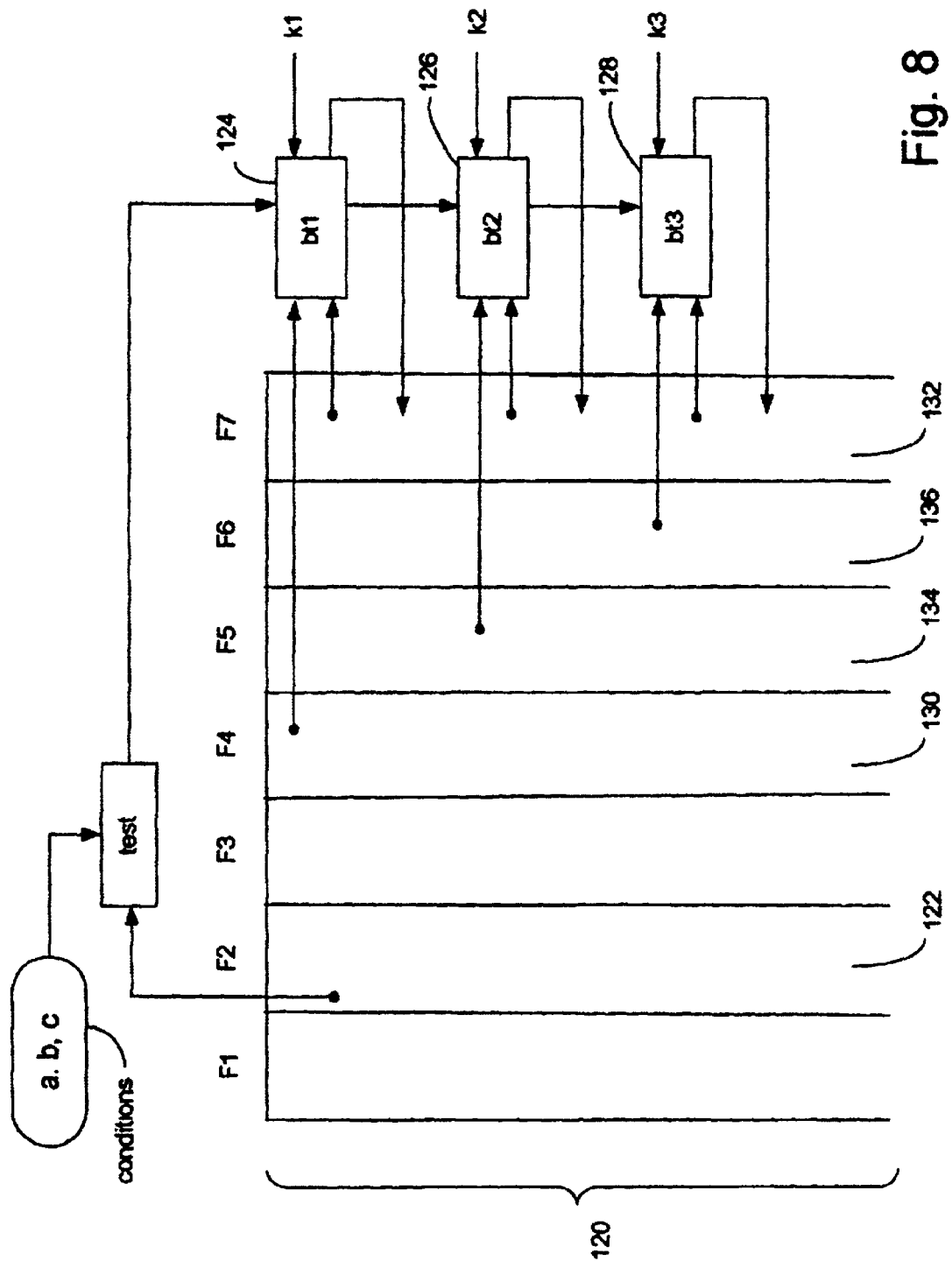
FIG. 8 illustrates a set of before-triggers affecting a table row.

FIG. 8 illustrates how a representative set of before-triggers affects a table row 120. According to the figure, a column F2 122 is tested to determine whether it meets a given condition, 'a', 'b' or 'c'.

If condition 'a' is met, then the action for before-trigger bt1 124 is activated. Before trigger bt1's action is shown in the figure as reading column F4 130 and F7 132 of the table in order to update column F7 132.

If condition 'b' is met, then the action for before-trigger bt2 126 is activated. This trigger reads column F5 134 and F7 132 in order to update F7 132.

If condition 'c' is met, then before trigger bt3 is activated, which trigger reads column F6 136 and F7 132 in order to update F7 132.

Figure 9:
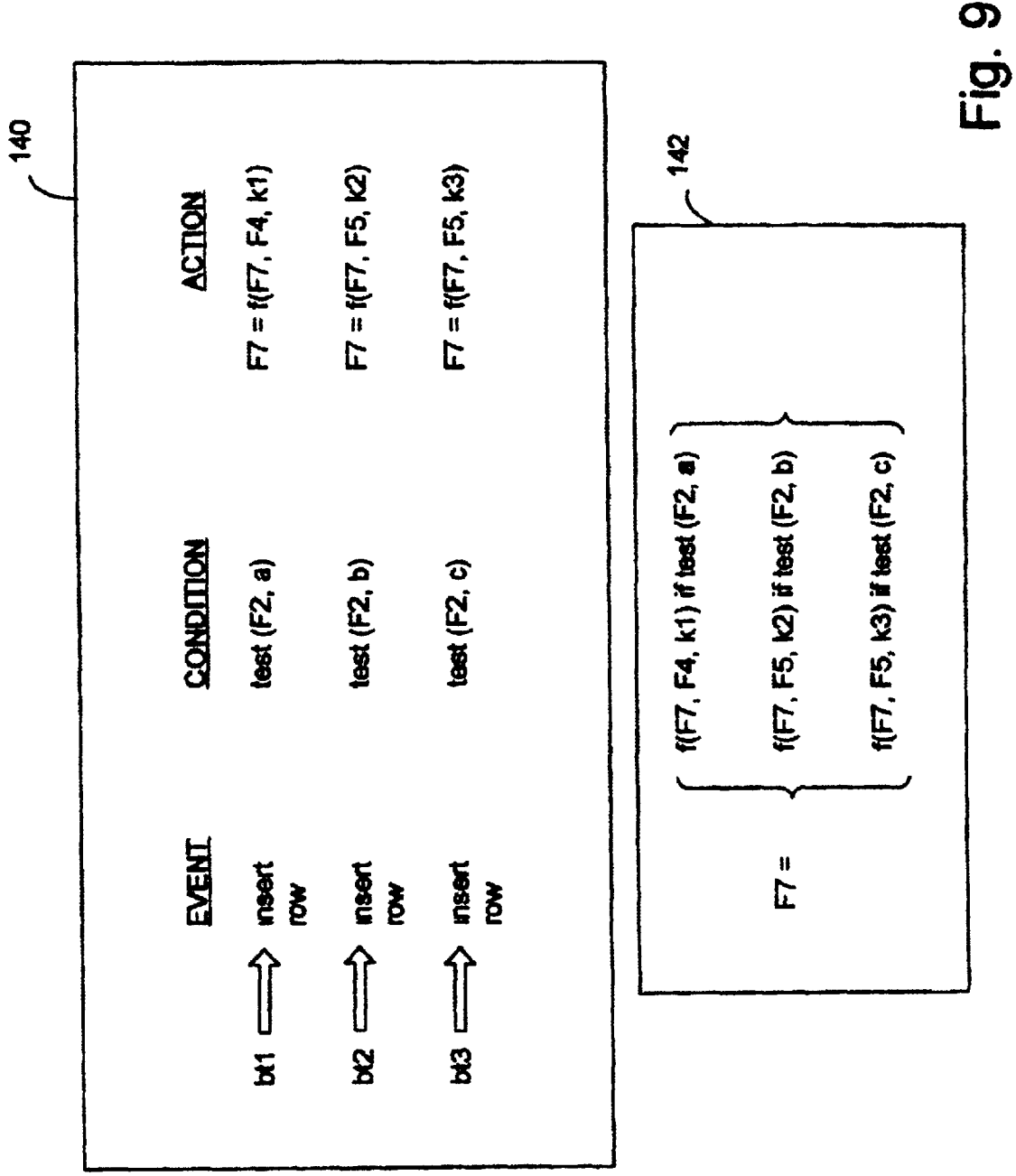
FIG. 9 illustrates the language statement of the before-triggers bt1–bt3, including a combined expression for the before-triggers.

FIG. 9 illustrates the event, condition and action for each before trigger and the lower box 142 illustrates a single expression that combines the actions and conditions of the triggers. The combined expression is used in the process of constructing an execution plan for the before triggers.

Figure 10:
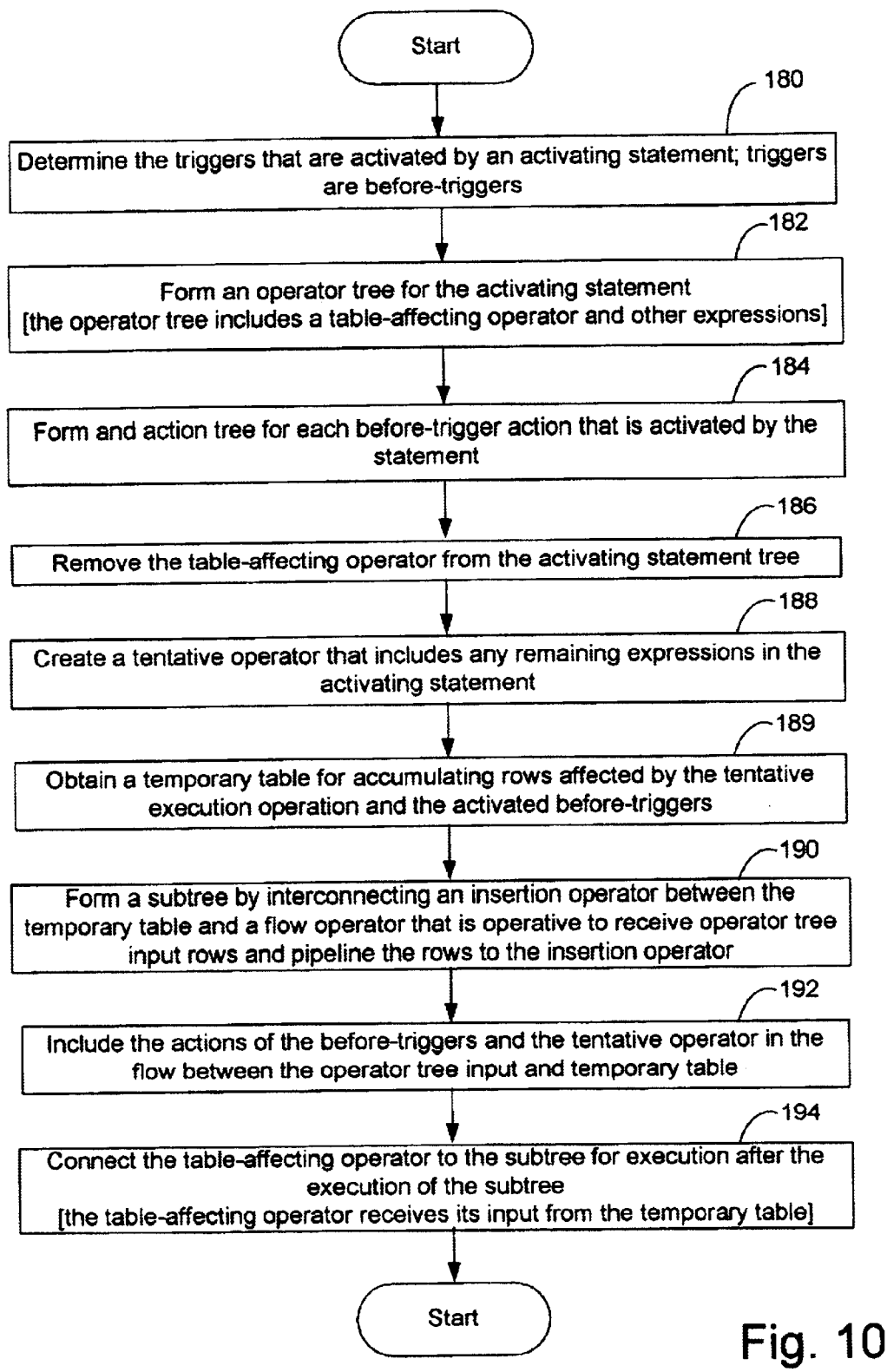
FIG. 10 shows a flow chart illustrating the steps for building an execution plan that includes before triggers.
Figure 13:
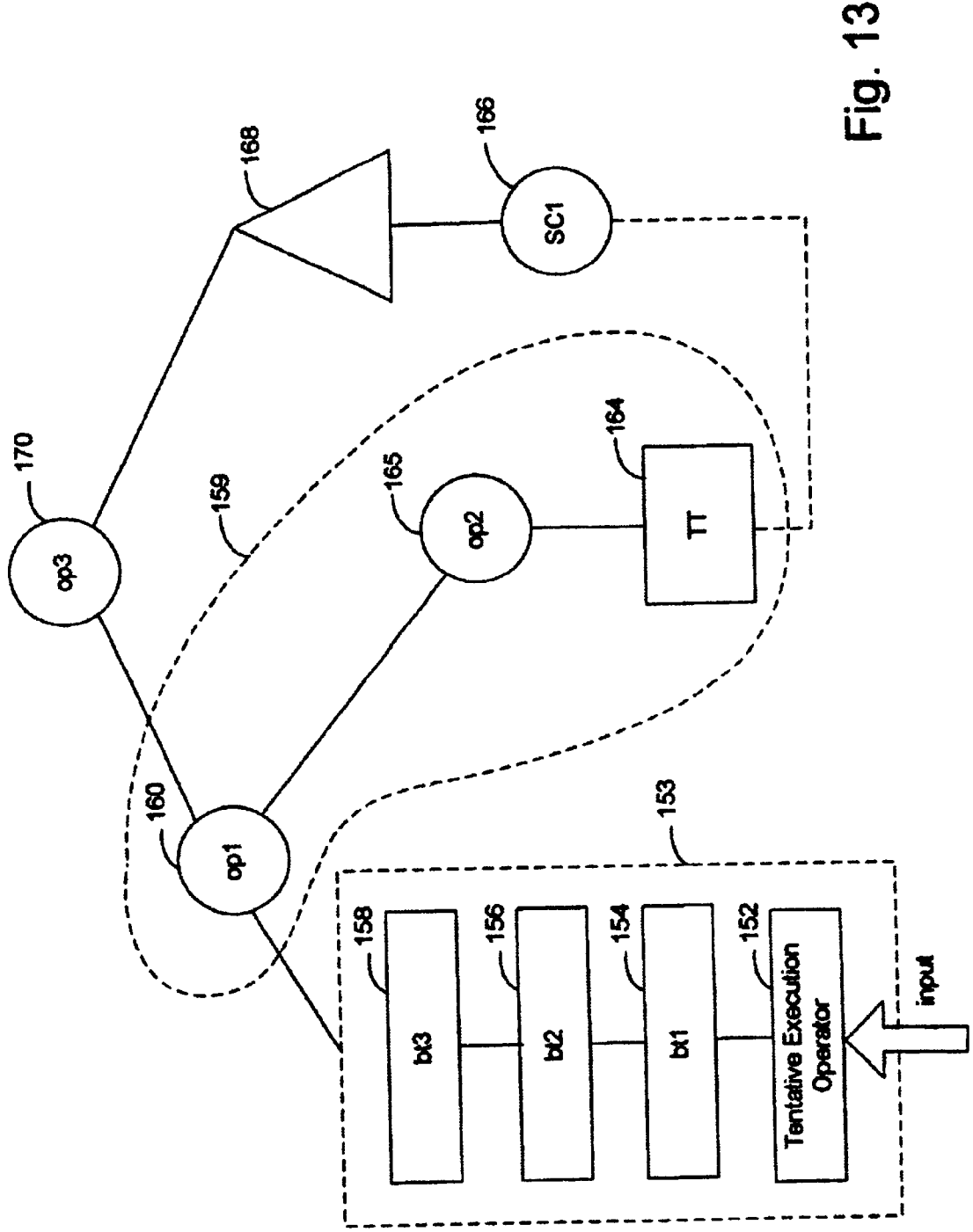
FIG. 13 shows an execution plan based on the flow charts of FIGS. 10 and 11.
Figure 14:
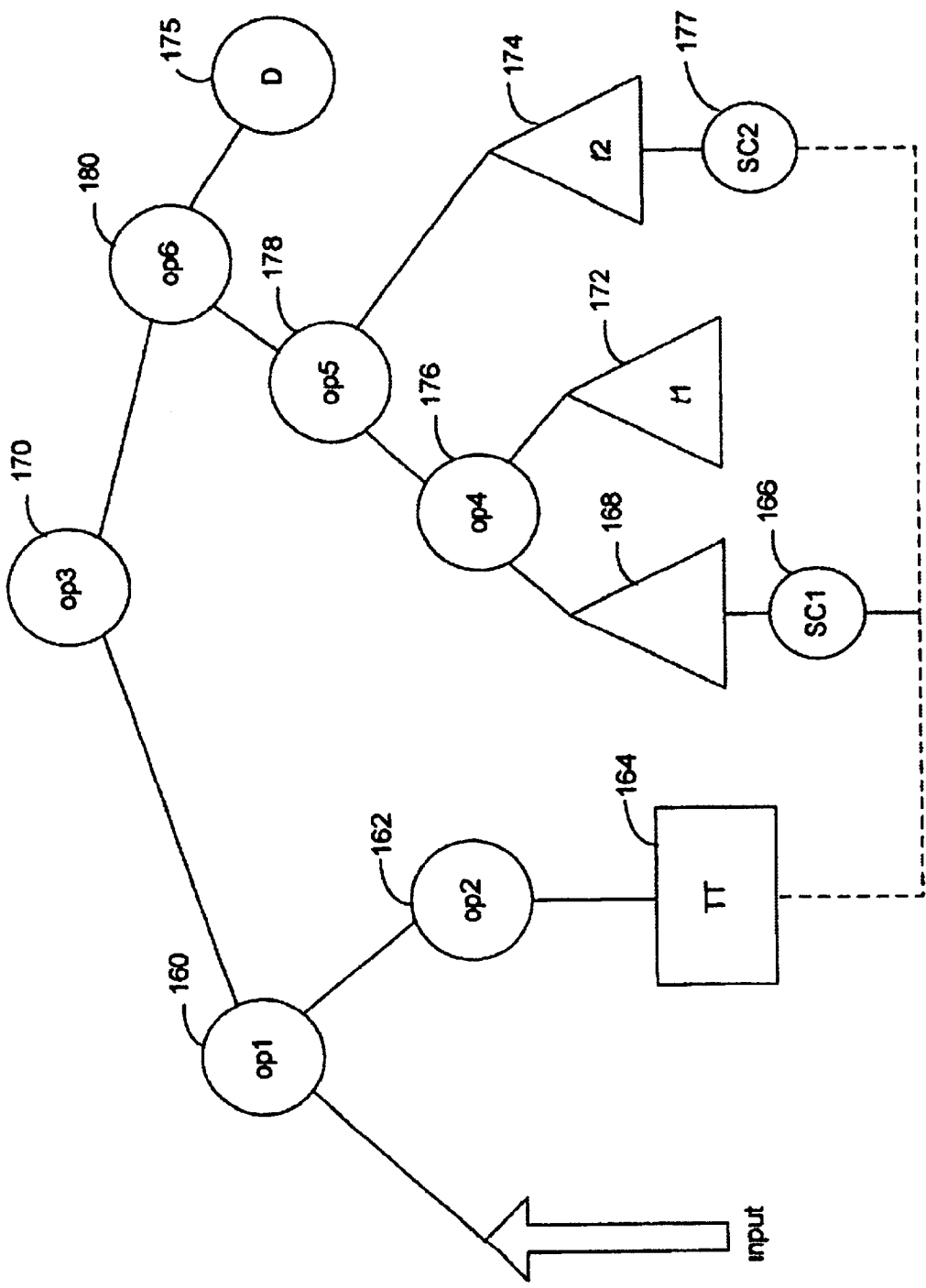
FIG. 14 shows an execution plan after the further transformation according to FIG. 12.

FIG. 10 illustrates a flow chart for the steps by which an execution plan is constructed for before triggers. FIG. 13 shows an execution plan after phase 1 of the process for constructing the plan and FIG. 14 shows the execution plan after phase 2 of the process.

Referring to FIG. 10 and FIG. 13, the first step 180 in the process is to determine the triggers that are activated by the activating statement S. These are assumed, in the present discussion, to be before-triggers, bt1, bt2 and bt3. An operator tree for the activating statement and action trees for the activated before-triggers are formed in steps 182 and 184 respectively. The order of these steps is not critical. Next, in step 186, the table affecting operator 168 (in FIG. 13) that is part of the activating statement is removed from the operator tree. A tentative execution operator 152 (in FIG. 13), which includes any remaining expressions in the operator tree of the activating statement is next created, in step 188, and a subtree 159 (in FIG. 13) is formed by interconnecting, in step 190, an insertion operator 165 between a temporary table 164 and a flow operator 160, as shown in FIG. 13. Next, in step 192, the actions of the before-triggers bt1–3 and the tentative operator 152 are included in the flow between the operator tree input and the temporary table. This step is performed according to the flow of FIG. 11.

Figure 11:
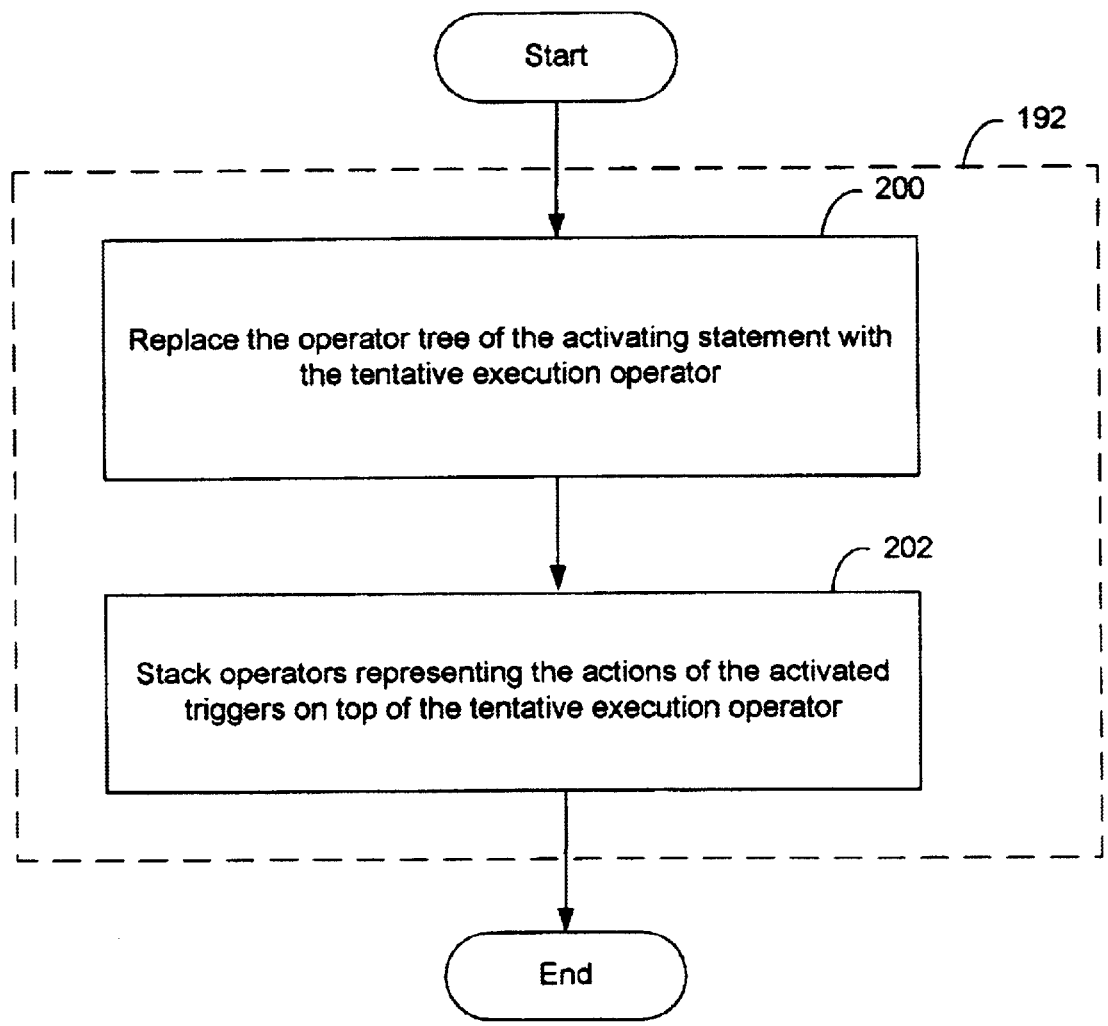
FIG. 11 shows a flow chart for one of the steps in FIG. 10.

In particular, according to FIG. 11, the operator tree for the activating statement is replaced with the tentative execution operator 152 (in FIG. 13) in step 200 and the before-triggers bt1–3 are stacked on top of the tentative execution operator 152 in step 202. These operators are illustrated as block 153 in FIG. 13.

Returning back to FIG. 10, after step 192, now the table-affecting operator 168 that was removed from the operator tree of the activating statement is connected, in step 194, to subtree 159 by an ordered union operator 170 so that the table-affecting operator is configured to execute after the execution of the subtree 159.

Figure 12:
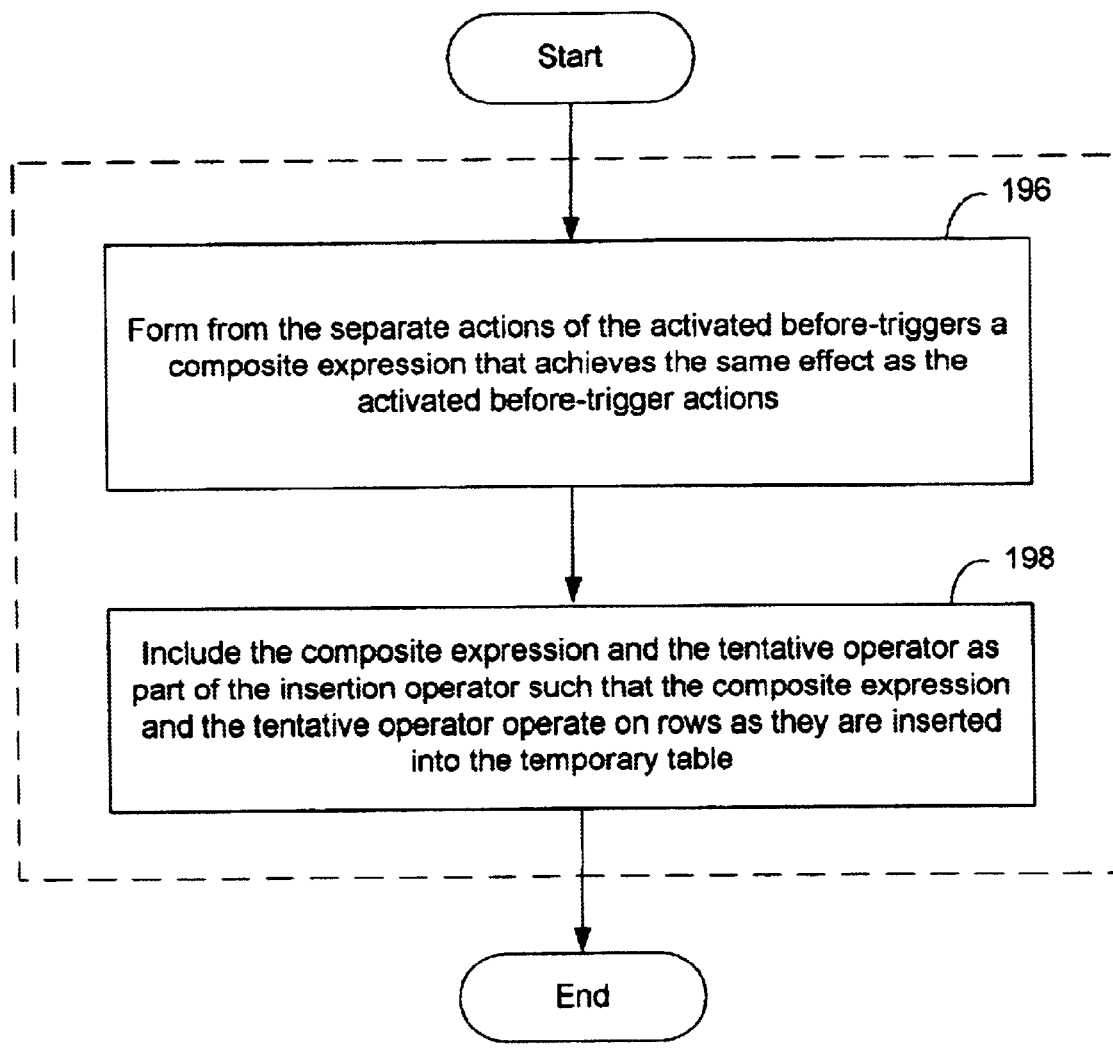
FIG. 12 shows a flow chart for a further transformation of the execution plan.

At this point, the execution plan is run through another phase, phase 2, in which the plan of FIG. 13 is transformed into the plan of FIG. 14. The steps in the phase are depicted in FIG. 12. In step 196, a combined expression 142 of FIG. 9 is formed from the separate actions of the activated triggers bt1–3. This combined expression achieves the same effect as the separate activated triggers bt1–3. In step 198, the combined expression and the tentative operator are made part of the insertion operator 162 of FIG. 14 so that the combined expression and tentative operator operate on the input rows as they are inserted into the temporary table.

The final execution plan, as shown in FIG. 14, shows the plan after phase 2. A flow operator op1 160 connects the input to the insertion operator 162 which is connected to the temporary table TT 164 to insert rows that are processed by the insertion operator 162. The table affecting operator 168 is connected to an ordered union operator 170 for execution subsequent to the execution of the insertion operator op2. The table affecting operator 168 uses a scan operator sc1 166 to obtain input from the temporary table TT 164.

Figure 15:
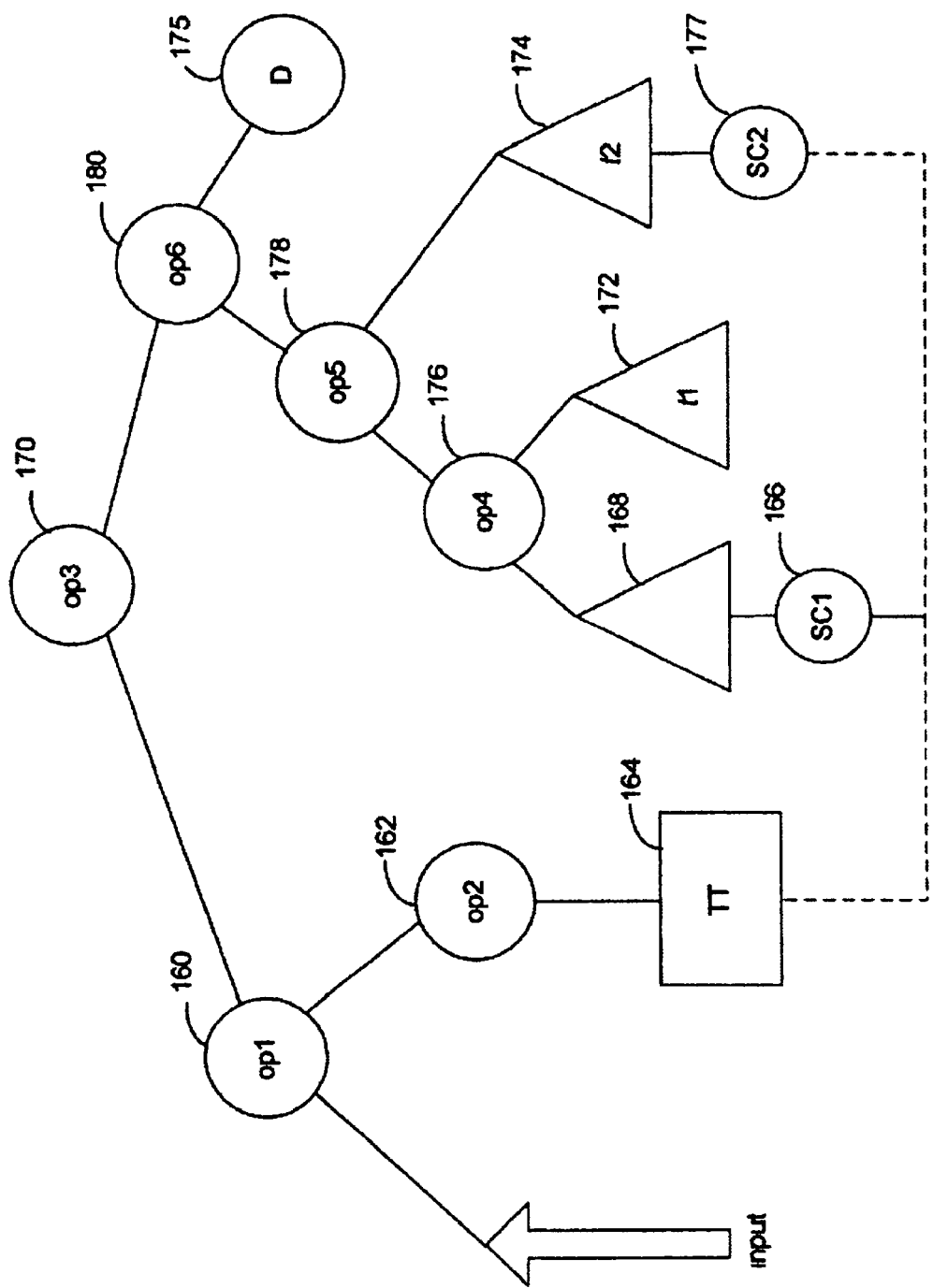
FIG. 15 shows an execution plan with integrated row-after and statement-after triggers and deletion operator.

FIG. 15 shows a final execution plan that integrates a plan for the execution of any row or statement-after triggers that may have been activated by the activating statement S. In particular, in FIG. 15, t1 172 is a row-after trigger and t2 174 is a statement-after trigger. The row-after trigger t1 is joined to the table-affecting operator 168 by a flow operator so that it can execute in a pipelined fashion with the table-affecting operator 168. The statement-after trigger t2 is interconnected via ordered union operator 178 for execution subsequent to the execution of the row trigger t1. The statement-after trigger t2 receives input from the temporary table via a scan operator sc2. A deletion operator D 175 for clearing the temporary table TT is interconnected for execution subsequent to the execution of the statement-after trigger 174 via an ordered union operator 180 and the entire right-half of the plan is interconnected for execution subsequent to the execution of the insertion operator 162 by ordered union operator 170.

FIG. 16 shows a timing chart to illustrate the execution of the insertion operator 162, and the row and statement after triggers. After the insertion operator 162, which includes the before triggers and the tentative execution operations, completes, the table affecting operator 168 starts execution. The row trigger t1 is pipelined with the table-affecting operator 168 and after trigger t1 completes execution, statement-after trigger t2 174 starts. Following the completion of t2, the deletion operator clears the temporary table TT.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method of forming an execution plan for a plurality of trigger actions in an active database having at least one table, each table having at least one row, comprising:

determining the triggers activated by an activating statement, wherein the activated triggers are before-triggers;

forming an operator tree for the activating statement, the activating statement including a table-affecting operator;

forming an action tree for each trigger action that is activated by the statement;

removing the table-affecting operator from the activating statement tree;

creating a tentative execution operator that includes any operations of the activating statement other than the table-affecting operator;

obtaining a temporary table for accumulating rows affected by the tentative execution operator and the activated before triggers;

forming a subtree by interconnecting an insertion operator between the temporary table and a flow operator that is operative to receive the operator tree input rows and pipeline the rows to the insertion operator;

inserting the actions of the activated before-triggers and the tentative execution operation into the flow between the operator tree input and temporary table; and connecting the table-affecting operator to the subtree for execution after the execution of the subtree, the table-affecting operator being configured to receive input from the temporary table.

2. A method of forming an execution plan as recited in claim 1, wherein the step of inserting the actions of the activated before-triggers and the tentative execution operation into the flow includes:

replacing the operator tree of the activating statement with the tentative execution operator configured to receive the operator tree input; and stacking operators representing the actions of the activated triggers on top of the tentative execution operator to receive rows affected by the tentative execution operator.

3. A method of forming an execution plan as recited in claim 2, further comprising the steps of:

removing the tentative execution operator and the stacked before-triggers from the execution plan;

forming from the actions of the activated before-triggers a combined expression that achieves the same effect as the activated before-triggers; and including the combined expression and the tentative execution operator as part of the insertion operator such that the composite expression and the tentative execution operator are configured to operate on rows as the rows are inserted into the temporary table.

4. A method of forming an execution plan as recited in claim 1, wherein the step of inserting the actions of the activated before-triggers and the tentative execution operation into the flow includes:

forming from the actions of the activated before-triggers a combined expression that achieves the same effect as the activated before-triggers; and including the combined expression and the tentative execution operator as part of the insertion operator such that the composite expression and the tentative execution operator are configured to operate on rows as the rows are inserted into the temporary table.

5. A method of forming an execution plan as recited in claim 1, wherein the activating statement activates at least one row-after trigger; and further including the step of interconnecting the row-after trigger for pipelined execution with the table-affecting operator.

6. A method of forming an execution plan as recited in claim 1, wherein the activating statement activates at least one statement-after trigger; and further including the step of interconnecting the statement-after trigger for execution subsequent to the table-affecting operator, the statement-after trigger being configured to receive input from the temporary table.

7. A method of forming an execution plan as recited in claim 6, wherein the statement-after trigger is connected to a scan operator to receive input from the temporary table.

8. A method of forming an execution plan as recited in claim 1, wherein the activating statement activates at least one statement-after trigger and at least one row-after trigger; and further including the steps of:

interconnecting the row-after trigger to the table-affecting operator for execution in a pipelined fashion with the table-affecting operator; and interconnecting the statement-after trigger for execution subsequent to the row-after trigger, the statement-after trigger being configured to receive input from the temporary table.

* * * * *